(12) United States Patent
Nakagoshi (10) Patent No.: US 12,125,068 B2
(45) Date of Patent: Oct. 22, 2024

(54) ADVERTISING SYSTEM FOR A SMARTPHONE OR A TABLET

(71) Applicant: Tatsuya Nakagoshi, Osaka (JP)

(72) Inventor: Tatsuya Nakagoshi, Osaka (JP)

( * ) Notice: Subject to any disclaimer, the term of this patent is extended or adjusted under 35 U.S.C. 154(b) by 0 days.

(21) Appl. No.: 17/398,452

(22) Filed: Aug. 10, 2021

(65) Prior Publication Data

US 2022/0051297 A1 Feb. 17, 2022

(30) Foreign Application Priority Data

Aug. 12, 2020 (JP) ................. 2020-136186

(51) Int. Cl.
*G06Q 30/0241* (2023.01)
*G06Q 30/0251* (2023.01)

(52) U.S. Cl.
CPC ..... *G06Q 30/0271* (2013.01); *G06Q 30/0267* (2013.01); *G06Q 30/0277* (2013.01)

(58) Field of Classification Search
None
See application file for complete search history.

(56) References Cited

U.S. PATENT DOCUMENTS

| 8,949,734 | B2* | 2/2015 | Stallings | G06F 3/0482 |
| | | | | 715/784 |
| 10,009,849 | B2* | 6/2018 | Ino | H04W 4/70 |
| 2010/0161418 | A1* | 6/2010 | Holt | G06Q 30/0269 |
| | | | | 705/14.66 |
| 2011/0143769 | A1* | 6/2011 | Jones | H04M 1/7246 |
| | | | | 455/566 |

(Continued)

FOREIGN PATENT DOCUMENTS

| JP | 2009-211669 | 9/2009 |
| JP | 2015-022368 | 2/2015 |

(Continued)

OTHER PUBLICATIONS

F. Adele Peters, "This startup lets users watch ads to get free mobile service", retrieved from <https://www.fastcompany.com/90325975/this-startup-lets-users-watch-ads-to-get-free-mobile-service>, available on Aug. 29, 2019 (Year: 2019).*

(Continued)

*Primary Examiner* — Sam Refai
(74) *Attorney, Agent, or Firm* — HSML P.C.

(57) ABSTRACT

There is no advertising system, the advertising program or the advertising method to enable low-priced communication fee of a cell phone such as smartphone, or tablet. The present invention provides an advertising system having a server and using a terminal such as a smartphone or a tablet. In the system, the server includes a server communication unit that can communicate with the terminal, a server memory unit that stores information of the application installed in the terminal, an advertising unit that distributes an advertisement to the terminal, and a counting unit that counts the duration of time of the advertisement having been displayed or the points corresponding to the time, an advertising unit displaying the advertisement on the terminal before starting the application when the application is selected, and a counting unit that counts the duration of time of the displayed advertisement or the points corresponding to the time.

2 Claims, 8 Drawing Sheets

(56) References Cited

U.S. PATENT DOCUMENTS

| | | | | |
|---|---|---|---|---|
| 2014/0122483 A1* | 5/2014 | Zhang | ................... | G06Q 50/01 |
| | | | | 707/758 |
| 2017/0055143 A1* | 2/2017 | Vacek | ..................... | H04W 4/24 |
| 2017/0156116 A1* | 6/2017 | Ino | ....................... | G06F 9/4418 |
| 2018/0109603 A1* | 4/2018 | Doumet | ............... | G06F 3/0482 |
| 2018/0285827 A1 | 10/2018 | Dotan-Cohen et al. | | |
| 2021/0098110 A1* | 4/2021 | Periyasamy | .......... | G16H 20/70 |

FOREIGN PATENT DOCUMENTS

| | | |
|---|---|---|
| JP | 2016-012370 | 1/2016 |
| JP | 2016-051440 | 4/2016 |
| JP | 2017-021768 | 1/2017 |
| JP | 2020-004303 | 1/2020 |
| JP | 2020-098496 | 6/2020 |

OTHER PUBLICATIONS

Office Action issued for the Japanese patent application No. 2020-136186, mailed on Jan. 8, 2021, 10 pages including machine translation.
Office Action issued for the Japanese patent application No. 2020-136186, mailed on Apr. 7, 2021, 10 pages including machine translation.
Miyazaki, Yuichiro et al., "Technology Reports—Development of an action estimation technique for realizing a service according to the behavior of a user", NTT Docomo Technical journal, Telecommunication Association, Oct. 1, 2009, vol. 17 No. 3, pp. 55-61; Discussed in the machine translation of the JP Office Action mailed on Apr. 7, 2021, p. 2, paragraph 1 and 2.

* cited by examiner

ADVERTISING SYSTEM FOR A SMARTPHONE OR A TABLET

TECHNICAL FIELD

This invention relates to an advertising system, advertising program, and advertising method for a terminal such as a smartphone or a tablet.

BACKGROUND ART

Conventionally, phone charge for a cell phone such as a smartphone is total of a basic fee, a data service fee, and a call charge.

Since this fee has no upper limit, which may result in high phone charge, a user often chooses a flat rate plan.

However, this flat rate plan also has a problem of slow transmission when exceeding upper data limit.

The flat rate plan with higher upper data limit charges more expensive monthly fee for a user to pay.

Patent document 1 shows the technology that a part of the download purchase fee is paid from the advertising fee by reimbursing a part of the communication fee of the user by showing advertisements instead of the conventional screen display during, before, or after the download when downloading charged music, videos, and games using cell phones or handy terminals.

PRIOR ART DOCUMENT

Patent Document

Patent Document 1

Japanese Unexamined Patent Application Publication No. 2009-211669

OUTLINE OF THE INVENTION

Technical Problem

However, problem is that the invention relates to patent document 1 only reduces actual downloading fee by showing advertisements when downloading a video or a game but does not reduce user's monthly cell phone fee.

In addition, a user may not have any interest in these advertisements and the companies providing the advertisements may not have much benefit.

It is difficult to get a user to be interested in the advertisements if these are shown regardless of the user's time schedule (push-type advertisements).

An advertisement that is less interested by a user may even give negative images to a user.

On the other hand, a company wants to provide its advertisement efficiently.

Currently, advertisements shown online are selected according to interests of a user by analyzing the user's internet search histories.

With a smartphone or a tablet, an internet browser is not used by a user but an application is directly started, therefore, it is difficult to accumulate accurate data to provide efficient advertisements.

The purpose of this invention is to provide an advertising system, advertising program, or advertising method to reduce communication fee for a cell phone, such as a smartphone or a tablet.

Another purpose of this invention is to provide an advertising system, advertising program, or advertising method for a sponsor such as a company to advertise efficiently.

Solution to Problem

The advertising system relates to the first aspect of this invention is the advertising system with a server and using a terminal including a smartphone or a tablet, a server consists of,
- a server communication unit that is transmissible to the terminal,
- a server memory unit to store application information of the application installed to the terminal,
- an advertising unit to distribute advertisements to the terminal,
- a counting unit to count duration of time or points corresponding to time the advertisements are shown, and
- it is the advertising system that the advertising unit shall display the advertisements on the terminal when selected the application, and the counting unit counts time or points corresponding to time.

An advertisement such as an advertising video shall be shown on a terminal such as a smartphone before starting the selected application installed on the terminal.

Duration of time and points corresponding to the duration of time the advertisements are shown are counted and communication fee of the terminal shall be reduced depending on the duration of time or numbers of points.

In this way, the user of the terminal may reduce its communication fee.

On the other hand, a sponsor who is an advertiser may effectively advertise by displaying its advertisement every time a user selects the application.

An advertising system that relates to the second aspect of this invention is that it relates to the first aspect,
- an advertisement is a video,
- a counting unit shall count time or the points for the time the video is played,
- a communication fee of the terminal is decided according to the count.

The communication fee is reduced according to the counts of the counting unit. In this way, communication fee of the terminal shall be lowered.

An advertising system that relates to the third aspect of this invention is that it is the advertisement system relates to the first and the second aspects of this invention,
- it includes a data collection analyzing unit that shall collect and analyze the application information of the terminal users,
- the data collection analyzing unit shall collect the application information, and the advertising unit displays the categories of advertisements related to the application.

"Category" is grouped, for instance, by an industry type or the purpose such as real estate, food and drink, sale of goods, fashion, game, or book.

For example, when a user selects a game application, an advertisement of game shall be shown on the terminal at that time or the next time advertisement is shown.

Another example is that on the terminal of a user who selected an application related a fashion brand, advertisements of the fashion brand such as sales information shall be shown.

In short, the advertisement that is related to the interests of the terminal user shall be shown and the advertisement that fits to user's needs shall be distributed.

Therefore, a sponsor such as a company that provides the advertisement shall do so effectively and lower the cost for promotion and advertisement.

An advertising system that relates to the fourth aspect of this invention is that it is the advertising system relates to the third aspects of this invention,
- a data collection analyzing unit is to collect the personal information of a terminal user, and
- an advertising unit is the advertising system that displays advertisements related to the terminal users based on the personal information and the application information.

For example, if the user using the health managing application such as a pedometer or heart rate meter, the terminal user is likely to be health conscious.

Since the personal information includes age and gender of the terminal user, an advertisement related to age and gender of the terminal user is sent (distributed) to the terminal from the advertising unit.

In this way, an advertisement customized for the terminal user is displayed, which fits to the terminal user's needs.

Therefore, a sponsor providing advertisement such as a company shall efficiently advertise and lower the advertising cost at the same time.

An advertising system that relates to the fifth aspect of this invention is to have a server and an advertising system using terminals including a smartphone or a tablet, the server consists of,
- a server communication unit to communicate with the terminal,
- a server memory unit to store the screen time information of the terminal,
- an advertising unit to distribute advertisement to the terminal,
- a data collection analyzing unit to collect and analyze the screen time information of the terminal, and
- an advertising unit displays advertisement on the terminal based on the screen time information collected by the terminal data collection analyzing unit.

"Screen time information" is the time the screen of a terminal such as a smartphone or a terminal (application) is running or not in sleep mode.

"Screen time information" includes behavior of each application running.

An advertisement that fit terminal user's lifestyle shall be provided by distributing an advertisement based on the screen time information.

For example, a night shift worker is likely to be active at nighttime. The screen time information shows the person's lifestyle and enables to distribute the advertisement that suits for the terminal user.

More specifically, the advertisement of coffee shall not be shown on the nighttime worker's terminal in the morning but in the evening.

An advertising system that relates to the sixth aspect of this invention is that this advertising system is relates to the fifth aspect,
- a data collection analyzing unit collects the terminal user's personal information,
- an advertising unit displays advertisements related to the terminal user based on the personal information and screen time.

The terminal user's lifestyle is known from the screen time information and the user's gender and job are found from the personal information.

For example, if the person is active at night and works as a nurse, the advertisement that is suitable after work shall be shown in the morning assuming the person's work is done at that time.

An advertising program that relates to the seventh aspect of this invention is that it is the advertising program using a terminal such as a smartphone or a tablet, it runs
- a server communication process that is transmissible with the terminal,
- a server memory process that store the information of the application installed to the terminal,
- an advertising process to distribute advertisements to the terminal,
- a counting process to count duration of time for the advertisement to be shown or points corresponding to the time.
- an advertising process displays an advertisement before starting the application when the application is selected, and
- a counting process counts duration of time or points corresponding duration of time the advertisement was shown.

Such program is as effective as the first aspect of this invention.

An advertising system that relates to the eighth aspect of this invention is that it is the advertising program relates to the seventh aspect of this invention, an advertisement is a video,
- a counting unit counts duration of time or points corresponding to duration of time the video was played, and
- a communication fee for the terminal is determined according to the count.

Such program is as effective as the second aspect of this invention.

An advertising program that relates to the ninth aspect of this invention is that it is the advertising program relates to the seventh and eighth aspects of this invention,
- it runs data collection analyzing process that collects and analyze the application information of the terminal user, and
- a data collection analyzing process collects the application information and the advertising process displays the advertisement which is in the related category to the application on the terminal.

Such program is as effective as the third aspect of this invention.

An advertising program that relates to the $10^{th}$ aspect of this invention is that it is the advertising program relates to the ninth aspect of this invention,
- a data collection analyzing process is to collect the personal information of the terminal user, and
- an advertising process displays the advertisements that are related to the terminal user based on the personal information and the application information.

Such program is as effective as the fourth aspect of this invention.

An advertising program that relates to the $11^{th}$ aspect of this invention is that it is the advertising program using a terminal such as a smartphone or a tablet,
- it runs the server communication process that is transmissible to the terminal,
- a server memory process that store the screen time information of the terminal,
- an advertising process to distribute advertisement to the terminal,
- a data collection analyzing process to collect and analyze the screen time information of the terminal, and a data collection analyzing process displays an advertisement on the terminal based on the screen time information.

Such advertisement program is as effective as the fifth aspect of this invention.

An advertising program that relates to the 12$^{th}$ aspect of this invention is that it is the advertising program relates to 11$^{th}$ aspect of this invention,
- a data collection analyzing process is to collect the personal information of the terminal user,
- an advertising process displays the advertisements that is related to the terminal user based on the personal information and screen time information on the terminal.

Such advertising program is as effective as the sixth aspect of this invention.

An advertising system that relates to the 13$^{th}$ aspect of this invention is that it has a server and an advertising method using terminals includes a smartphone or a tablet,
the server includes
- a server communication process transmissible to the terminal,
- a server memory process that stores information of the application installed to the terminal,
- an advertising process that distributes an advertisement to the terminal,
- a counting process that counts duration of the time or points corresponding to the time the advertisement was shown, and
- it is the advertising system that displays advertisements on the terminal before starting the application when the application is selected in the advertising process, and that counts duration of time or points corresponding to the time the advertisement was shown in the counting process.

Such advertising method is as effective as the first or the seventh aspect of this invention.

An advertising method that relates to the 14$^{th}$ aspect of this invention is that it is the advertising method relates to 13$^{th}$ aspect of this invention,
- an advertisement is a video,
- a counting process counts duration of time and points corresponding to the time the video was played, and
- a communication fees for the terminal is determined according to the counts.

Such advertising method is as effective as the second or the eighth aspect of this invention.

An advertising method relates to the 15$^{th}$ aspect of this invention is that it is the advertising method relates to the 13$^{th}$ or 14$^{th}$ aspect of this invention,
- the server incudes a data collection and analyzing process to collect and analyze the application information in the data collection and analyzing process,
- an application information is collected in the data collection and analyzing process and displays an advertisement in the category relates to the application on the terminal.

Such advertising method is as effective as the third or ninth aspect of this invention.

An advertising method relates to the 16$^{th}$ aspects of this invention is that it is the advertising method relates to 15th aspect of this invention,
- the server is to collect personal information of the terminal user in the data collection and analyzing process, and
- the server displays an advertisement relates to the terminal user based on the personal information and the application information in the advertising process.

Such advertising method is as effective as the fourth or the 10$^{th}$ aspect of this invention.

An advertising method relates to the 17$^{th}$ aspect of this invention is that it has a server and it is the advertising method using terminals including a smartphone or a tablet,
the server includes
- a server process transmissible to the terminal,
- a server memory process to store the screen time of the terminal,
- an advertising process to distribute an advertisement to the terminal,
- a data collection and analyzing process to collect and analyze the screen time information of the terminal, and
- the server displays an advertisement on the terminal in the advertising process based on the screen time information gained in the data collection analyzing process.

Such advertising method is as effective as the fifth or the 11$^{th}$ aspects of this invention.

An advertising method relates to the 18$^{th}$ aspect of this invention is that it is the advertising method relates to the 17$^{th}$ aspect of this invention,
- a data collection analyzing process is to collect the personal information of the terminal users, and
- an advertising process displays advertisements relates to terminal user based on the personal information and the screen time information.

Such advertising method is as effective as the sixth or 12$^{th}$ aspect of this invention.

DESCRIPTION OF EMBODIMENTS

Figure 1:
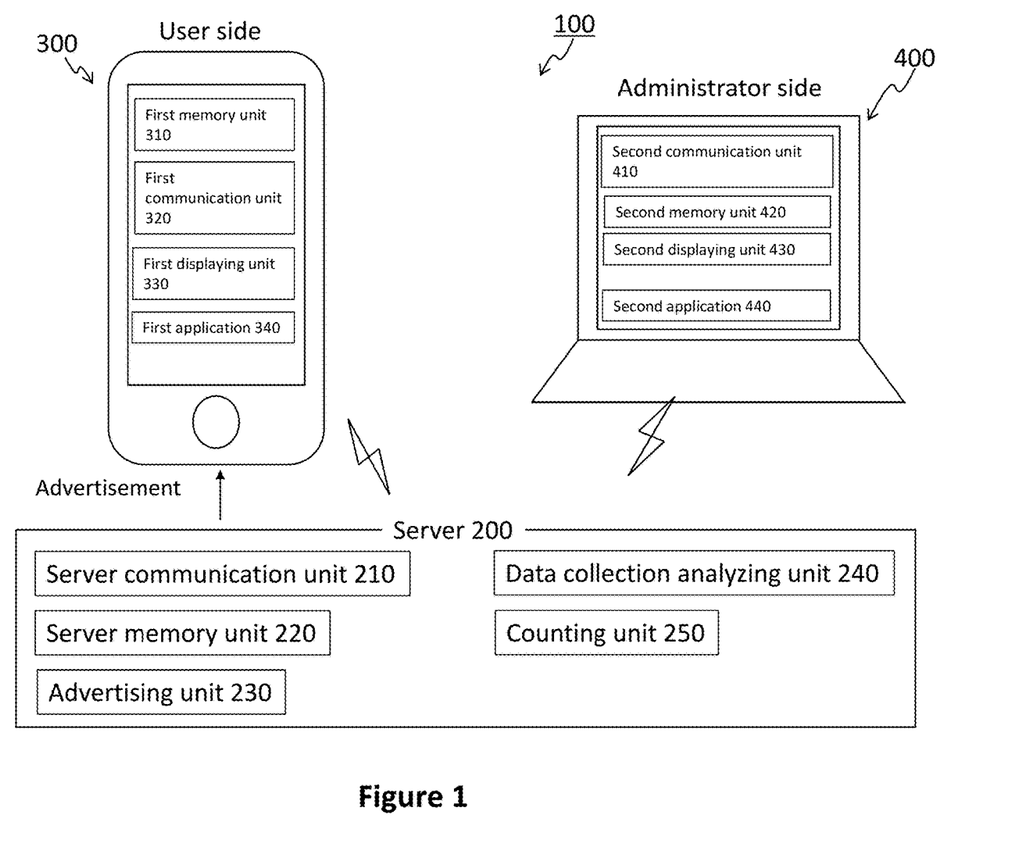
FIG. 1 Conceptual scheme of an embodiment example of this invention of advertising system FIG. 2 Conceptual scheme of advertising system of above embodiment FIG. 3 Conceptual scheme of advertising system of above embodiment FIG. 4 Flow chart of the advertisement system of above embodiment FIG. 5 Flow chart of the advertisement system of above embodiment FIG. 6 Flow chart of the advertisement system of above embodiment FIG. 7 Flow chart of the advertisement system of above embodiment FIG. 8 Conceptual scheme of MLM using the advertising system of above embodiment

Followings are explanation of embodiments of this invention referring to the drawings As shown in FIG. 1, the advertising system 100 related to this invention includes Server 200, the first terminal 300 that is owned by the user and transmissible with Server 200, and the second terminal 400 that is owned by an administrator and transmissible with Server 200.

(Server 200)

Server 200 includes the server communication unit 210 to communicate with the first terminal 300 and the second terminal 400,
a server memory unit 220 to store data, an advertising unit 230 to display advertisements on the first terminal 300, a data collection analyzing unit 240 to collect and analyze data, and a counting unit 250 to count duration of time and points corresponding to duration of the time the advertisement was distributed Server 200 is a cloud server in this embodiment. The "cloud server" is a server built on the cloud and it functions as a server through internet.

Cloud server 200 is used in this embodiment as a server, but a conventional server may be used.

Server communication unit 210 is the unit for wireless/wired communication, and transmittable with the first terminal 300 and the second terminal 400.

Server memory unit 220 is the unit to store the information and personal information of the personal information and advertisement information of the first terminal 300 user and data analyzed by the data collection analyzing unit 240 are stored.

The advertising unit 230 is the unit displays an advertisement on the first terminal 300. Specifically, the advertising unit 230 displays an advertisement on the displaying unit such as on the liquid crystal panel of the first terminal 300.

The advertising unit 230 displays an advertisement on the first terminal 300 every time an application on the first terminal 300 is opened.

In this embodiment, the advertising unit 230 displays an advertisement video on the first terminal 300 every time an application displayed on the first terminal 300 is opened.

It is possible to disable display of the advertisement video on the first terminal 300.

It is also possible to stop the advertisement video in the middle of playing and open the application. This means to skip the advertisement.

In this embodiment, the distribution system of the advertisement information is not by downloading but by streaming. In this way, the storage capacity of the first terminal 300 shall not be burdened too much.

The advertisement information stored on the server memory unit 220 is categorized by time, genres, and locations.

(Advertisements by Time)

The advertising unit 230 distribute an advertisement categorized by time to the first terminal 300.

Specifically, in case the first terminal 300 user started using call phone in the early morning around 7:00, advertisement of coffee may be displayed on the first terminal 300 at that time.

In the above case, when the first terminal 300 user opens any application displayed on the terminal from 7:00 to 9:00, the advertising unit distributes advertisement video of coffee.

Another example is, when the first terminal 300 user starts operating the cell phone around 18:00, assuming the person is finished working, the advertising unit 230 distributes the advertisement information of beer.

In the above case, the first terminal 300 user opens any application displayed on the first terminal 300 from 18:00 to 21:00, the advertising unit 230 displays an advertisement video of beer on the displaying unit of the first terminal 300.

The time frame setting and distribution time setting for advertisement are arbitrary. The second terminal 400 user may conduct these settings using the second terminal 400.

After the advertisement video play is completed, the counting unit 250 counts duration of the time or points corresponding to the time the advertisement was played.

The counting unit 250 may count duration of time or points corresponding to the time for played advertisements even they are not fully played.

The server memory unit 220 stores screen time of the first terminal 300.

The advertising unit 230 distributes the advertisement information based on the screen time information of the first terminal 300 stored in the server memory unit 220.

The data collection analyzing unit 240 collects and analyze screen time information of the first terminal 300.

Figure 2:
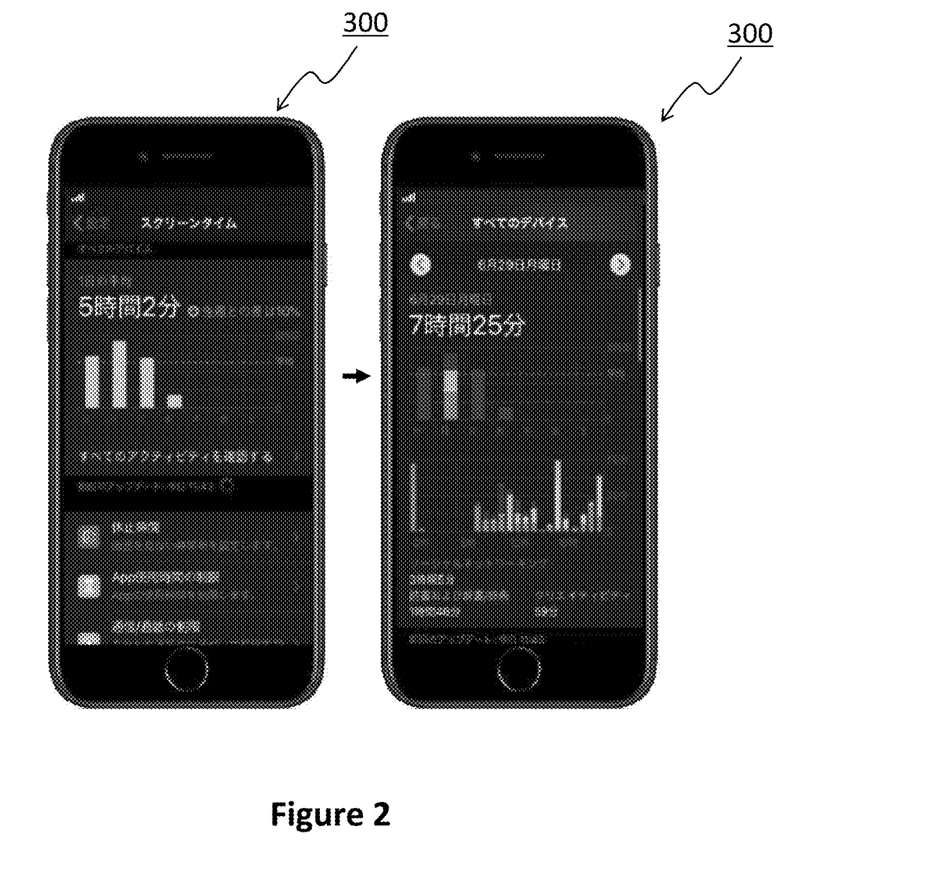

Specifically, as shown in FIG. 2, the screen time information of the first terminal 300 provides information of time frame which the user operates the cell phone.

Information found in this embodiment is that the average daily operation time of the first terminal 300 user is 5 hours and 2 minutes in the week, 7 hours and 25 minutes on Monday, and from what time in the morning the user starts operating the cell phone.

The data collection analyzing unit 240 collects and analyze such information and accumulate it in the server memory unit 220.

For example, if the first terminal 300 user who usually finish operating the terminal between 23:00 and 24:00 but the person operates (starts application) the terminal around 24:00 to 26:00, it may be assumed that the person has trouble sleeping.

Therefore, in this case, the advertising unit 230 displays an advertisement of a comfortable pillow when an application on the first terminal 300 is started.

When the first terminal 300 user opens any application displayed on the first terminal 300 between 24:00 and 26:00, an advertisement video of a comfortable pillow is distributed.

In this way, the advertising unit 230 displays the advertisement that fits to the lifestyle of the first terminal 300 user on the first terminal 300.

(Advertisement by Genre)

The advertising unit 230 distributes the advertisement categorized by genres to the first terminal 300.

Specifically, when the first terminal 300 user open any application displayed on the terminal, the advertisement video that has similar genre with the application is distributed.

For example, in case the first terminal 300 user opens the body weight scale application, it may be assumed that the user is interested in losing weight.

Therefore, in this case, the advertising unit 230 displays the advertisement video related to weight loss on the displaying unit of the first terminal 300, when an application on the terminal is started.

The timing of displaying the advertisement by the advertising unit may be set differently. In this case, the advertising unit 230 may distribute an advertisement video related to weight loss only when body weight scale application is opened, or whenever any application is opened on the terminal.

Another example is that, when search or purchase of a product is made through internet shopping application displayed on the first terminal 300, the advertising unit 230 distributes an advertisement video of the same genre.

Specifically, when the first terminal 300 user opens the Amazon (Registered Trademark) application displayed on the terminal and searched for a gaming chair, assuming the first terminal 300 user may be interested in a gaming chair, the advertising unit 230 distributes the advertisement video that are related to a gaming chair to the first terminal 300.

In case of PC such as desktop, internet search is conventionally done by using search site (Internet browser) such as Google (Registered Trademark). On the other hand, in case of cell phones such as a smartphone or a tablet, the user does not use an internet browser but an application, the accumulated data of the user on the internet browser are not useful to customize the advertisement of the interest of the first terminal 300 user.

However, in this embodiment, it is possible to collect information of which applications are opened by the first terminal 300 user (Details will be described below) with search results and usage information, and the advertisement that fits to the user's interests shall be displayed effectively.
(Advertisement by Geography)

The data collection analyzing unit 240 collects the geographical location of the first terminal 300 and data of the location where the user uses frequently from the first terminal 300.

The location of the first terminal 300 is judged using GPS and logs on the first terminal 300.

The advertising unit 230 distributes the advertisement of the vicinity of the first terminal 300 when any application on the first terminal 300 is opened.

For example, when the first terminal 300 user opens the gourmet information application such as TABEROGU (Registered Trademark), The advertising unit 230 displays an advertisement of gourmet information in the vicinity of the first terminal 300.

In this case, the advertising unit 230 may display the advertisement of the gourmet information in the vicinity of the first terminal 300 only when the user opens the gourmet information application or when the user opens an application except the gourmet information application.

The advertising unit 230 may distributes an advertisement video not only when the application on the first terminal 300 is opened but also when playing videos, downloading a video and music, or an application.

The advertising unit 230 may also distribute an advertisement periodically.

Although the advertisement video is preferable for the advertising unit 230 to distribute, it is not necessary for the advertisement to be in a video form but may be in an different form such as a picture.

The advertisement by geographical location may be selected based on not only the location of the first terminal 300, but also on the searched location for travel.

For example, when Okinawa was searched using the first terminal 300, the advertising unit 230 displays information about Okinawa on the displaying unit of the first terminal 300.

Another example is that, when the word "snow festival" was searched on the first terminal 300, the advertising unit 230 displays information related to "snow festival" on the displaying unit of the first terminal 300.

In this way, with this embodiment, the advertising system 100 is useful for contribution for local communities, and local revitalization.

The data collection analyzing unit 240 collects and analyze the information from multiple first terminal 300.

The data collection analyzing unit 240 collects and analyze the screen time information of the first terminal 300, the usage information of the application installed on the terminal and location information of the terminal.

Specifically, the data collection analyzing unit 240 collects and analyze the screen time information of the first terminal 300.

As shown in FIG. 2, the daily schedule of the first terminal 300 user may be found from the screen time information.

In other words, the data collection analyzing unit 240 collects and analyze the screen time information of the first terminal 300 and assume the user's daily schedule.

For example, when the user's occupation is known as a nurse from the personal information of the first terminal 300, and the terminal is usually used from midnight to early morning, it may be assumed that the user of the first terminal 300 has a night shift.

In this case, it is more effective to distribute the advertisement video of coffee in the nighttime before work rather than in the morning when the user finish working.

Therefore, the data collection analyzing unit 240 analyzes screen time including the personal information of the first terminal 300 stored in the server memory unit 220.

Then, based on the analyzed result by the data collection analyzing unit 240, the advertising unit 230 distributes the advertisement video to the first terminal 300.

The data collection analyzing unit 240 collects and analyze the usage information of applications displayed on the first terminal 300.

Specifically, the data collection analyzing unit 240 collects the screen time information on the first terminal 300, which includes information of the applications used and time of usage of the application.

Therefore, the data collection analyzing unit 240 collects the usage information of the application by collecting the screen time information of the first terminal 300.

For example, the first terminal 300 user starts the application of real estate displayed on the first terminal 300, the data collection analyzing unit 240 collects that information.

Then, the data collection analyzing unit 240 assumes that the first terminal 300 user is interested in real estates, and the advertising unit 230 distributes the advertisement video regarding real estates in the vicinity of the first terminal 300 user.

The data collection analyzing unit 240 determines the importance of the application from the time or frequency of use of the application.

The advertising unit 230 decides that the application that is used long time and frequently is more important than others and distributes the advertisement video related to the application to the first terminal 300.

In this way, the advertising unit 230 provides the advertisement video that fits the needs of the first terminal 300 user to the user.

The counting unit 250 counts the duration of time or the points corresponding to the time the advertisement was played on the first terminal 300.

In the other words, when the advertisement video is played, the counting unit 250 counts the duration of time or the points corresponding to the time the advertisement was played assuming the first terminal 300 user watched the advertisement video.

The communication fee of the first terminal 300 may be reduced according to the duration of time or the points corresponding to the time.

The counting unit 250 may count the duration of time or the points corresponding to the time of the advertisement for its full length even if it was not fully played.

The counting unit 250 may also count when advertisement video is played to the end.
(The First Terminal 300)

The first terminal 300 is the terminal the user of the advertising system 100 uses.

The first terminal 300 consists of the first communication unit 310 to communicate with the server 200, the first memory unit 320 that stores the personal information and various application of the first terminal 300 users, the first displaying unit 330 that displays the advertisement including various applications and videos, and the first application 340 that is to use the advertisement system related to this embodiment.

The first communication unit 310 is to communicate with the server 200. The transmission method is arbitrary, but wireless is preferable.

In this embodiment, the advertisement video is distributed from the server 200 via the first communication unit 310, displayed on the first displaying unit 340.

The first memory unit 320 stores the first application 340 or various applications.

The first memory unit 320 also stores the personal information of the user.

Specifically, the first memory unit 320 stores the screen time information and location information.

The first displaying unit 330 is the unit to display the first application 340 or various applications.

In this embodiment, the first displaying unit 330 is a liquid crystal panel, and touch panel.

The first application 340 is the application to start the advertising system 100 related to this embodiment.

Figure 3:
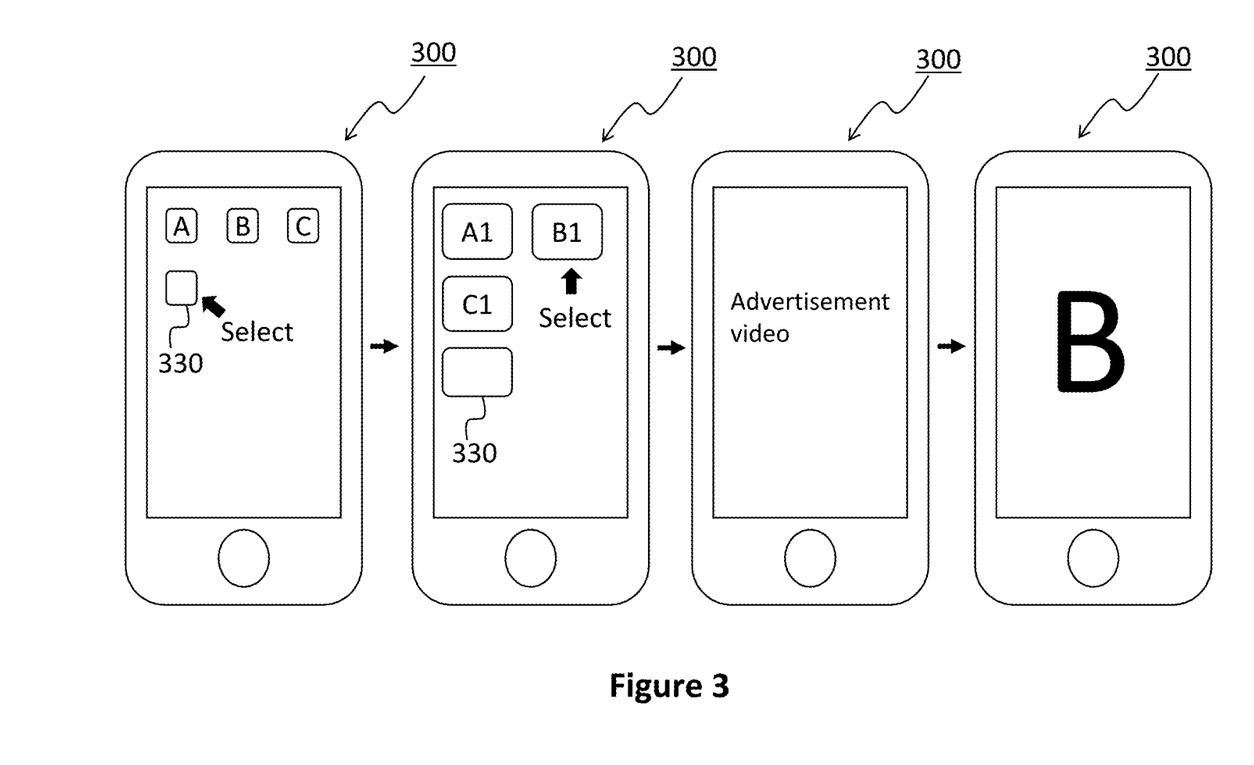

Specifically, as shown in FIG. 3, the first terminal 300 user selects the first application 340 displayed on the first displaying unit 330.

When the first application 340 is started, the screen is replaced to the screen displayed on the first displaying unit 330 or a like is shown.

The screen shown on the first displaying unit 330 when the first application 340 is activated may not need to be the same or the similar screen with the original screen that was shown on the first displaying unit 330.

In short, the application icons for A, B, and C are replaced with application A1, B1, and C1.

For example, when application B1 is selected, the advertising unit 230 distributes the advertisement video and it is displayed on the first displaying unit 330.

When the advertisement video is played to the end or skipped while viewing, application B activates.

In short, when application A1 is selected, application A opens after the advertisement video is played (or skipped). In the same way, when application B1 is selected, application B opens after the advertisement video is played (or skipped), and when application C1 is selected, application C opens after the advertisement video is played (or skipped).

The advertisement video may be stopped even it is still playing (it may be skipped). However, the counting unit 250 may not count the time or points.

(The Second Terminal 400)

The second terminal 400 is the terminal used by the administrator who controls the advertisement system 100.

The second terminal 400 includes the second communication unit 410 for the server 200 to transmit with, the second memory unit 420 that stores personal information of the first terminal 300 users and various applications, the second displaying unit that displays various applications, advertisement videos, and the like, and the second application 440 to control the advertising system related to this embodiment.

The second communication unit 410 is to communicate with the server 200. The transmission method may be chosen either wired or wireless.

The second communication unit accesses to the server 200 and the administrator of the second terminal 400 edits the contents of the server 200.

The second memory unit 420 may store the various applications and advertisement videos as a backup of the server memory unit 220.

The second displaying unit 430 displays the contents of the server 200 when the contents are edited.

The second displaying unit 430 may also play and display the advertisement video to be stored on the server 200 (The server memory unit 220) before distributing the advertisement video.

The administrator of the second terminal 400 may confirm that the advertisement video is played without failure before displaying them on the first terminal 300.

The second application 440 is the application to directly access to the server 200.

The administrator of the second terminal 400 may access to the server immediately by selecting the second application 440.

(The Advertising System 100 Flow Chart)

Figure 4:
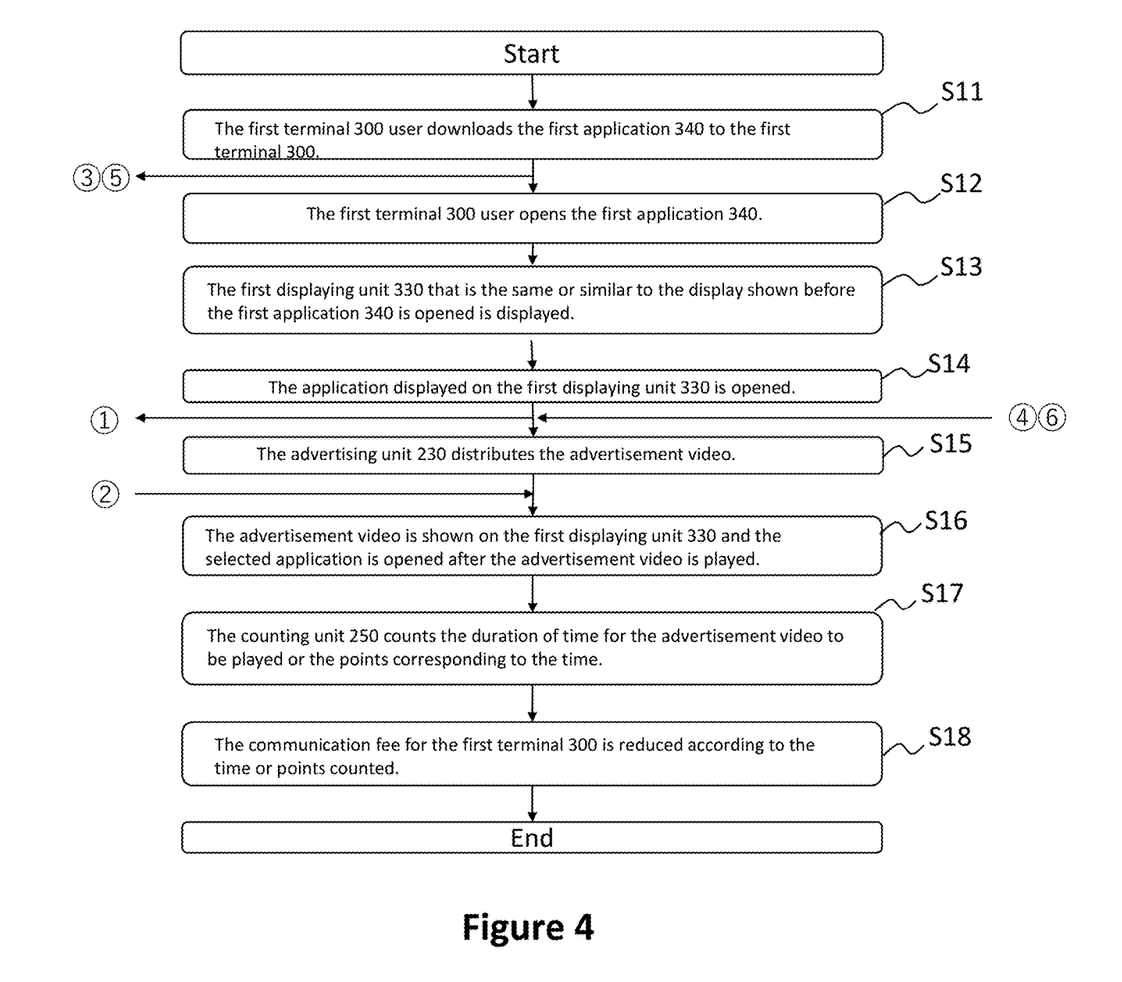

The first terminal 300 user downloads the first application 340 to the first terminal 300 (Step S11).

The first terminal 300 user opens (activates) the first application 340 (Step S12)

The first displaying unit 330 that is the same with or similar to the display shown before the first application 340 is opened (Step S13).

Once the application shown on the first displaying unit is opened, the advertising unit 230 distributes the advertisement video (Step S14, Step S15, and the advertising process).

Next, the advertisement video is played on the first displaying unit 330, and selected application is opened after the advertisement video is played (or skipped) (Step S16, the advertising process).

The counting unit 250 counts the duration of time for the advertisement video to be played or the point corresponding to the time (Step S17, counting process).

The communication fee of the first terminal 300 is reduced according to the time or the point counted (Step S18).

Figure 5:
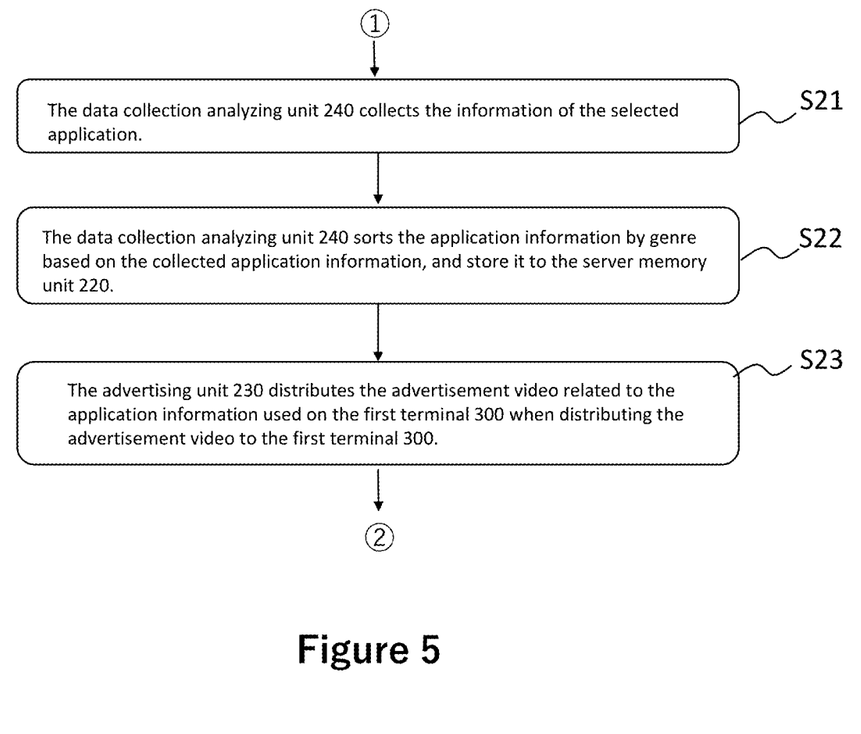

On the other hand, the data collection analyzing unit 240 collects the information of the application selected (Step S21, the data collection analyzing process).

The data collection analyzing unit 240 sorts the collected application information according to their genre and stores in the server memory unit 220 (Step S22, the data collection analyzing process).

The advertising unit 230 distributes the advertisement video related to the application information used by the first terminal 300 when distributing the advertisement video to the first terminal 300 (Step S23, the advertising process).

Figure 6:
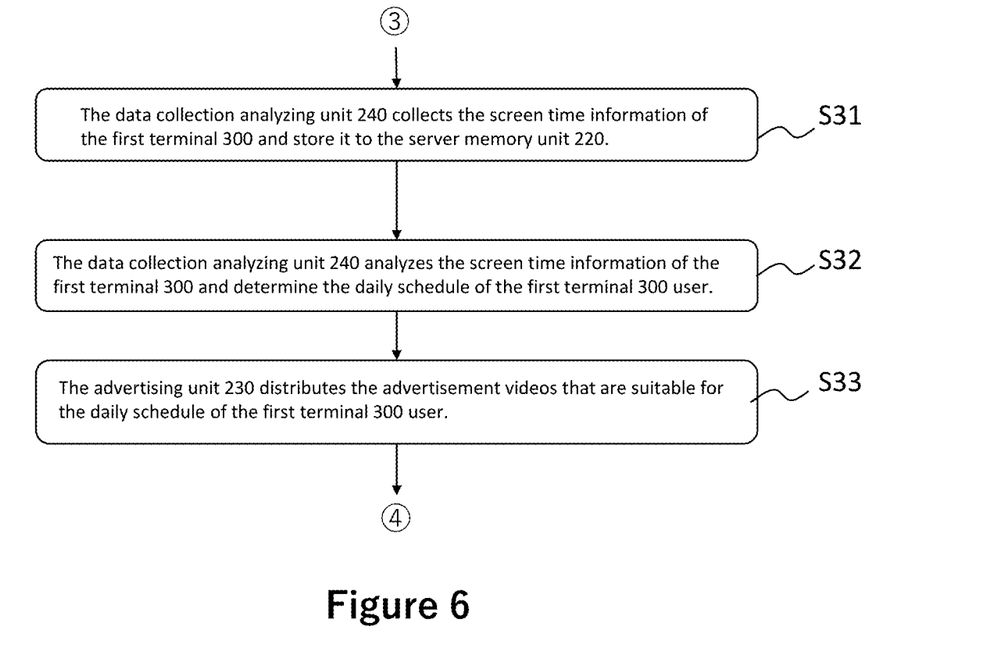

On the other hand, the data collection analyzing unit 240 collects the screen time information of the first terminal 300 and stores it in the server memory unit 220 (Step S31, the data collection analyzing process).

The data collection analyzing unit 240 analyzes the screen time information of the first terminal 300 and determines the daily time schedule of the first terminal 300 users (Step S32, the data collection analyzing process).

The advertising unit 230 distributes the advertising video that is suitable for the first terminal 300 user's daily time schedule (Step S33, the advertising process).

Figure 7:
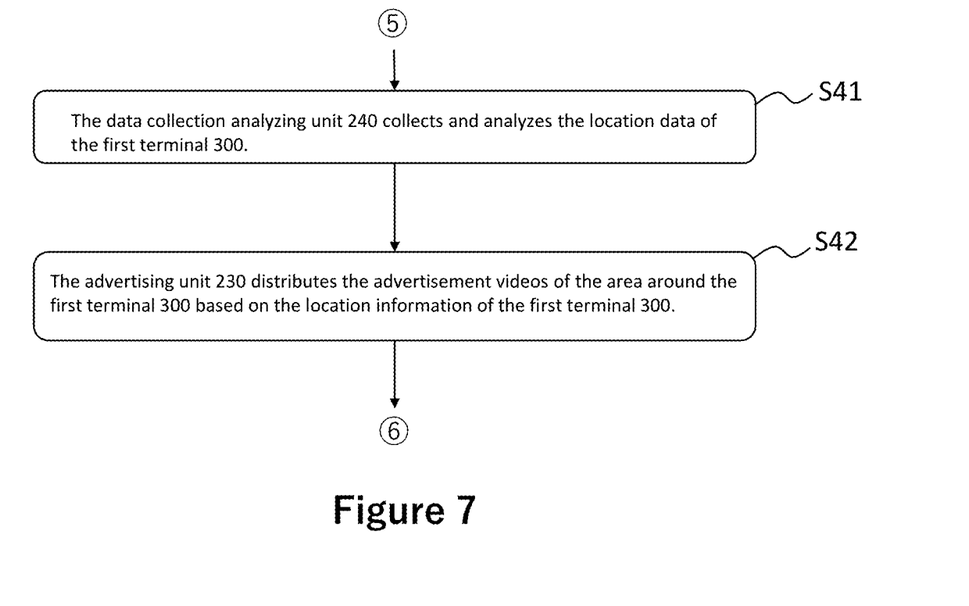

On the other hand, the data collection analyzing unit 240 collects and analyze the location information of the first terminal 300 (Step S41, the data collection analyzing process).

The advertising unit 230 distributes the advertisement video of in the vicinity of the first terminal 300 based on the location information (Step S42, the advertising process).

From the above, with this invention, it is possible to distribute the advertisement that is suitable for the first terminal 300 user based on gender, residential area, occupation, daily time schedule, hobbies, and the like.

(The Use of this Invention in MLM)

Using the advertising system 100 of this embodiment, the communication fee of the smart phone (the first terminal 300) is reduced for the amount of the advertising fee and it can be even lowered by using the low price SIM for a smart phone if the terminal is the smart phone.

Although the low price SIM is getting to be known, the details about it are not understood well.

In order to improve understanding of the low price SIM, the advertising system 100 may use MLM (Multi-level marketing).

Figure 8:
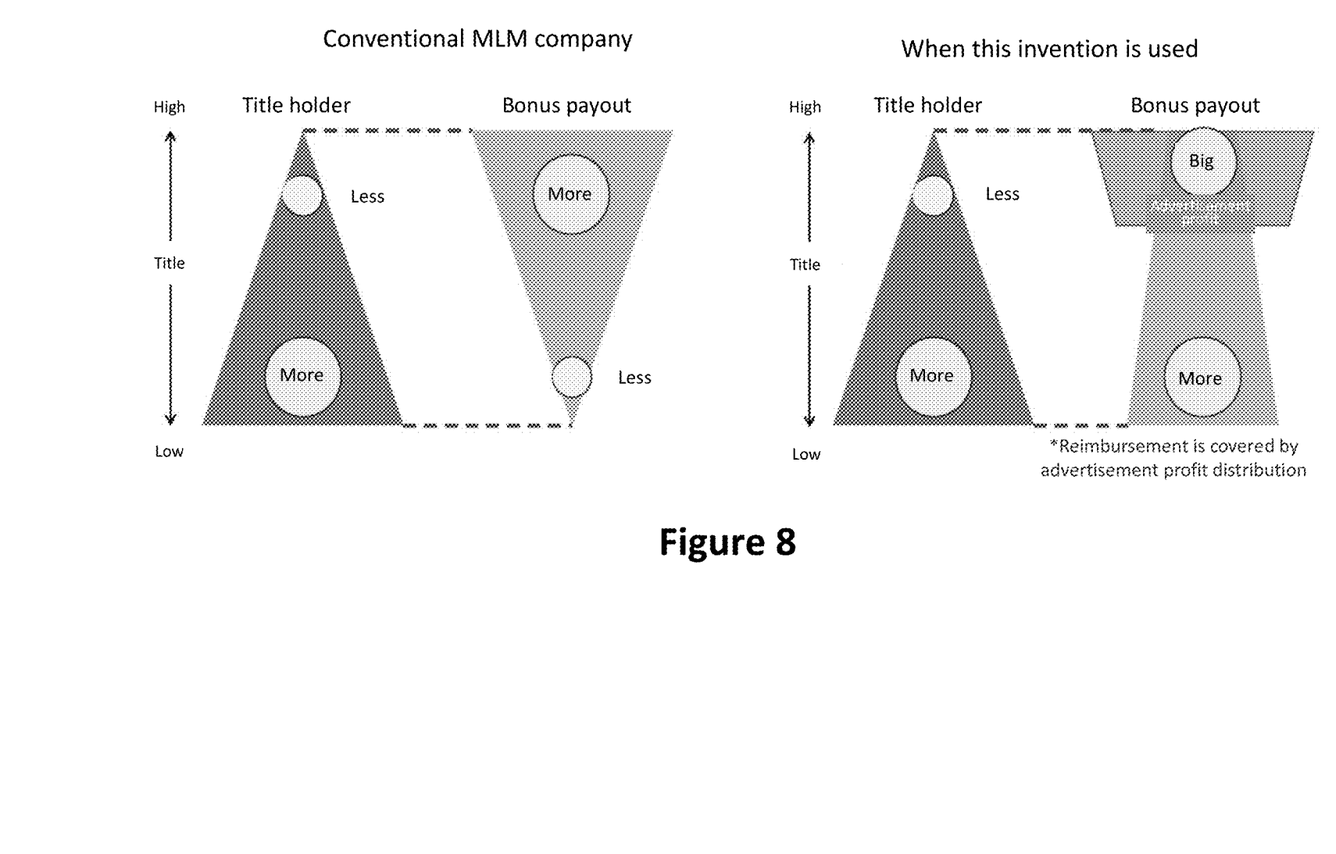

As shown in the FIG. 8, MLM usually has less bonus when title level is low while it has more bonus when title level is high.

MLM usually doesn't have advertisement income, therefore, MLM deducts costs and profit of the company from the income, then the rest of the amount is reimbursed to the members. In this way, the amount of reimbursement is small.

However, as shown in the FIG. 8, bonus may be more even when title level is low, and advertisement income is reimbursed when the title level is high using the advertising system 100.

In this way, reimbursed rate is high even when title level is low, and maintains high reimbursed rate compared to conventional MLM.

Therefore, the advertising system 100 in this embodiment has such effects.

This invention may be improved, modified, or changed its form as long as it does not deviate the purpose.

EXPLANATION OF SYMBOLS

100: Advertising system
200: Server
210: Server communication unit
220: Server memory unit
230: Advertising unit
240: Data collection analyzing unit
250: Counting unit
300: The first terminal
310: The first communication unit
320: The first memory unit
330: The first displaying unit
340: The first application
400: The second terminal
410: The second communication unit
420: The second memory unit
430: The second displaying unit
440: The second application

The invention claimed is:

1. An advertising system, comprising:
a server; and
a terminal,
wherein the server comprises:
  a server communication unit configured to communicatively connect the server to the terminal;
  a server memory configured to store screen time information regarding the terminal;
  an advertising distributor configured to distribute a streamed advertisement for display to the terminal;
  a data collection analyzer configured to collect and analyze the screen time information of a terminal user; and
  a counter configured to count a length of time for which the advertisement distributed by the advertising distributor is displayed on the terminal,
    wherein the advertising distributor is further configured to enable the advertisement to be displayed on the terminal based on the screen time information that the data collection analyzer collected,
wherein the terminal comprises:
  a display configured to display an operation screen image that includes a first icon to activate an application on the terminal, and
  a first memory configured to:
    store the application, and
    store a first application that is configured to display an advertisement displaying screen image that is capable of displaying the advertisement on the display, the first application being activated in response to a terminal user selecting the first icon,
  wherein the advertising distributor is further configured to enable the display to display the advertisement when a second icon is selected by the terminal user, and
  the counter is further configured to count points according to the length of time for which the advertisement distributed is displayed on the terminal for reduction of a communication fee for the terminal.

2. The advertising system of claim 1, wherein
the data collection analyzer is further configured to collect personal information of the terminal user, and
the advertising distributor is further configured to display the advertisement related to the terminal user based on the collected personal information and the analyzed screen time information.

\* \* \* \* \*